July 2, 1957  H. C. McKAY  2,797,961
TEMPORARY VISORS AS FOR VEHICLES
Filed Aug. 5, 1950
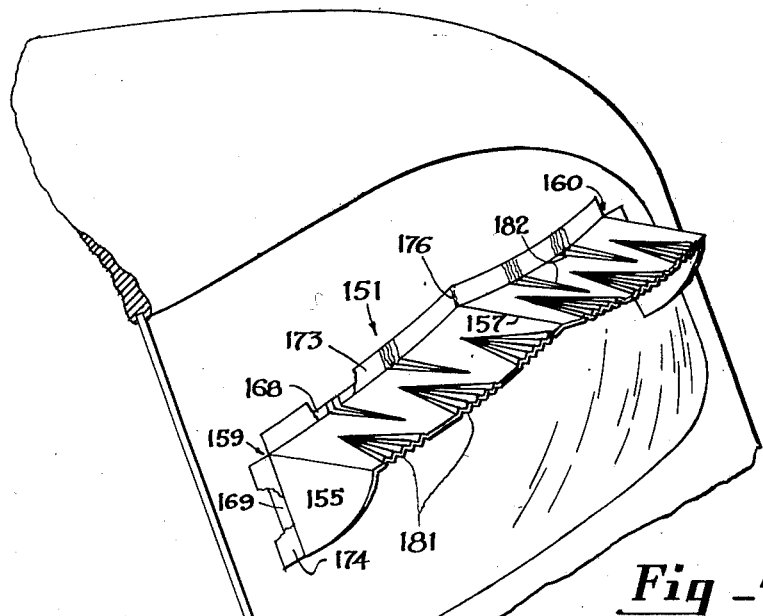
Fig_4.
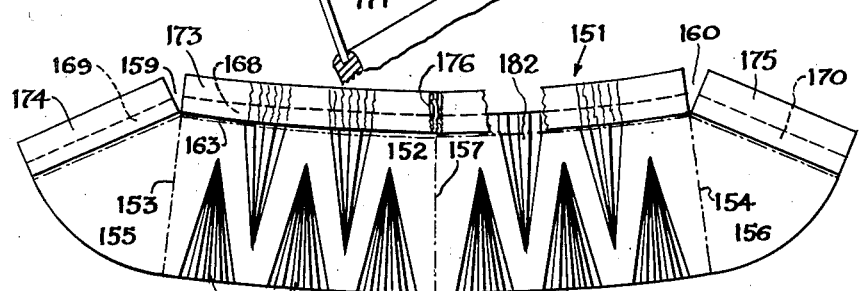
Fig_1.
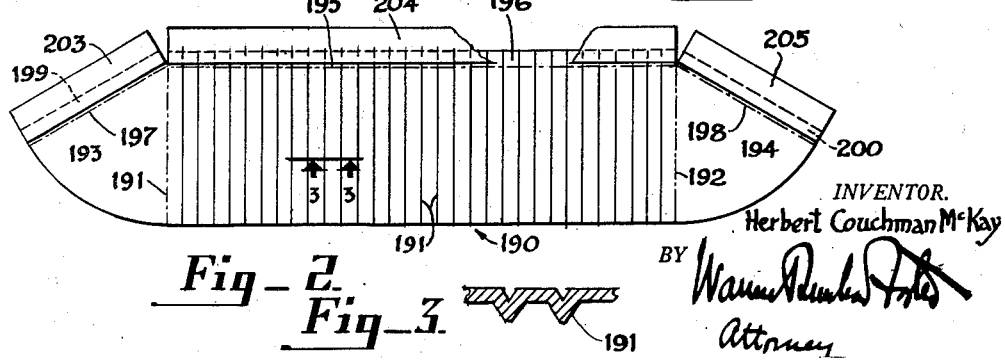
Fig_2.
Fig_3.
INVENTOR.
Herbert Couchman McKay
BY
ATTORNEY

2,797,961

TEMPORARY VISORS AS FOR VEHICLES

Herbert Couchman McKay, Eustis, Fla.

Application August 5, 1950, Serial No. 177,853

13 Claims. (Cl. 296—95)

There are many times when a temporary or removable visor or shield is desirable for a window or other transparent portion of an enclosure, particularly for a windshield of an automobile or other vehicle. Such a device may be employed to shield the eyes of occupants or to keep a windshield clear of water, as for one example only when an automobile is parked in a drive-in theatre during rain.

According to my invention as disclosed and claimed herein such a visor is made for relatively temporary use. For this purpose it is made of a relatively expendable and inexpensive material so that it can be thrown away after use whether for a few hours or longer, depending upon the materials used and weather conditions. It is so designed that it may be almost instantly applied.

My expendable visor in its most simple and inexpensive form is made of any cheap flat material which is reasonably water proof for a limited period and can readily be folded into the necessary shapes. Substances which I have found satisfactory are varnished fiber board, oiled cardboard and the like. In the expendable type the body of the visor is made of a single flat paper-like sheet to which an adhesive or an adhesive strip is supplied. This sheet is folded in accordance with preformed grooves or predetermined patterns and by means of the adhesive applied to the windshield for example. Folding may be by automatic machinery or the visors may be shipped flat and formed adjacent the place where they are used. Because of expense I may prefer to make my shield of a material which will withstand rain for a few hours. Heavy rain for a full evening and tests even more severe have shown that my visors formed from even the most inexpensive sheet material which I have employed will remain effective for a full show of a drive-in theatre under most severe weather conditions.

Although my invention is not so limited, one field of particular use is in drive-in theatres. At the present time rainy evenings have resulted in very heavy losses to such places of amusement. In fact in some sections of the country where rain is very frequent during certain seasons of the year drive-in theatres have not been built because of prohibitive losses on this account. Snow is a related but less important problem. Present expedients to prevent rain collecting upon windshields and thus obscuring view of the screen have proved unsatisfactory. Certain chemicals which have been rubbed or sprayed on windshields for this purpose have been ineffective and also have irritated the drivers of the automobiles to the extent that they have refused permission for the liquid to be applied, since it is difficult to remove and collects dirt. Some theatre owners have tried the application of detachable relatively expensive shields or visors but at the conclusion of a performance every driver has been so anxious to leave that it has proved impracticable to remove these devices. When my invention is in use as a car drives in on a rainy evening an attendant merely wipes off the windshield, as he does at present in many better drive-in theatres, and presses either one or two shields to the windshield, depending upon whether or not the car is one which has a center post. This application is a matter of a very few seconds only. At the conclusion of the performance the car is simply driven away with the visor in place. It can be taken off in an instant at the convenience of a driver or it may be left in position as a protection aginst glare or additional rain.

Advertisements may be printed upon such visors as they now are upon bags in which pop corn is sold in many theatres. While the advertisements are not always visible during the performance, as is true in the case of the bags, my visors with their advertisements are taken home, as the bag is not, with the advertisement visible. In some cases when the shield is left on the automobile for a considerable period it is of course seen by many people.

Another use of my visors of a design primarily for protection against the glare of sun or headlights is by the owners of resorts such as gardens, springs and other resort attractions such as those in the southeast and west. Since my visors are really useful they do not irritate the driver as do advertising streamers which are currently attached to front and rear bumpers.

It should be understood that I am giving these two uses of my novel device merely for purposes of illustration only. My visors may be used wherever an inexpensive and quickly applied device temporarily protecting a transparent window against rain, snow, light or glare is desired. While a visor made according to my invention is particularly applicable to construction from sheets which are so cheap that it can be thrown away after short use other and more lasting materials can be employed depending solely upon economic conditions.

Another object of my invention is the provision of a visor expendable material, which is particularly well adapted for use upon a curved surface. Included within this object is provision for compensation for such curvature in the body of the sheet when necessary and also in an attaching flange along the upper horizontal side of the visor.

The objects of my invention will be evident in the above discussion, the following portion of this specification, the attached drawings and the sub-joined claims. These objects include the provision of expendable instantly detachable protective visors.

Although I am showing preferred forms only of my invention for purposes of illustration only it will be readily understood that changes may be made without departing from the spirit of my invention or the scope of my broader claims.

In the drawings:

Figures 1 to 4 show forms of my invention adapted for application to a curved windshield. They may also be used on a windshield which is flat.

Figure 1 is a top plan view partly broken away of a preferred form of such a visor before folding.

Figure 2 which corresponds to Figure 1 is a top plan view partly broken away of a construction alternative to that of Figure 1.

Figure 3 is a section taken on the line 3—3 of Figure 2 and looking in the direction of the arrows.

Figure 4 is an isometric view partly broken away of such a preferred form of visor, in place upon a windshield. It corresponds to the form of Figure 1.

The forms of my invention shown in these figures are adapted for application to a curved windshield. They may also be used on a windshield which is flat.

Lines on which a sheet is to be folded are indicated before folding in dot-and-dash lines. Notches can be cut in the upper edge of the plane sheet to assist in the formation of wings when the wing portions are bent away from the body portions on the appropriate fold lines.

An important object of my invention is to provide an auxiliary shield which prevents drip from the forward edge of the visor to be used as in a drive-in theatre particularly with the modern type of automobile which has a windshield with a central vertical division. In this case two visors ordinarily are supplied (one for each side).

As will best be seen in Figure 1 a visor such as that generally indicated as 151 is stamped from a single piece 152 of expendable material such as any one of those previously described which is slightly curved in its horizontal dimensions as viewed in the drawings. This sheet is creased at 153 and 154 shown by dot and dash line to be folded at 90 degrees to form end pieces or wings 155 and 156 and at 157 to be folded at approximately 5 degrees to form a gable in the resulting roof-like structure. Lines on which a sheet is to be folded are indicated before folding in dot and dash lines. Notches or slits 159 and 160 are cut in the upper edges of the plane sheet to assist in the formation of the wings when these portions are bent away from the body portion at the lines 153 and 154. An upper edge portion is creased at 163 in both wing and body portions so that it can be bent upwardly to form narrow flat supporting extension surfaces or attaching flanges 168, 169 and 170, the first mentioned being for the main or roof portion of the visor and those later mentioned being for the respective wing surfaces. Notches 159 and 160 are necessary when or if the material is bent on the various fold lines with the wings and central upward extension bent on different axes at right angles to the body portion. These top extensions are disposed for attachment to a windshield 171 of an automobile as will be clearly seen from Figure 4. An adhesive tape 173, considerably wider than the tapes previously described, is attached to supporting surface 168 and similar and separate tapes 174 and 175 are attached to supporting surfaces 167 and 170 respectively. The adhesive portions of these tapes of course extend beyond the edge of the supporting surfaces and face rearwardly for attachment to the windshield. Also they are extended slightly beyond the adjacent ends of the extensions to assist in sealing notches 159 and 160. Whatever slight leakage, if any, occurs at this point is of no consequence because its stream is immediately adjacent the stream downward from the outside of the wings. The protected rectangle through which a spectator looks is kept dry. A central loop 176 is formed in tape 173 to permit the forwardly extending or roof portion of the visor to be bent at a slight angle to form the very obtuse gable as will clearly be seen in Figure 4, thus preventing sagging in the middle.

Hereinabove the adhesive has been described as applied in the form of an adhesive tape. I have found it equally effective to apply an adhesive coat, preferably in the form of a rubber-base or Scotch cement, directly to the body of the sheet. This adhesive may be any one of several well known types which is effective when a body carrying it is pressed against a hard dry surface, such as a windshield which has just been wiped clean. In this case a single sheet of heavy paper-like waterproofed material, with compensating formations, is employed.

In order to accommodate the curve in the surface 171 of the windshield, if it is at all decided, compensation in the body of the sheet is necessary. To secure such compensation I stamp two series of V-shaped corrugations in the visor while it is flat, one set 181 having the broad end of each set outwardly disposed and the other 182 having such broad ends inwardly and extending from the visor across the upstanding supporting member 168. As will be noted from the drawings each of these folds comes to a common point in a fan shape. As the visor is curved backwardly as it is about to be applied to a curved windshield these corrugations 181 will open and tend to become flattened. When the visor is so moved the corrugations 182 across the edge of the support 168 and the adhesive 107 when applied to glass of commonly formed degrees of curvature will tend to become more tightly pleated or corrugated. The portions of the corrugations 182 which extend across the upstanding strip or attaching flange 168 take the place of the central notch such as 28 previously described and shown and furnish the necessary compensation or surplus material when the roof is peaked sidewise or curved.

Alternatively I may supply only two sets of corrugations such as 182 with their bases toward the glass and form four such as 181 with their bases out, a total of six instead of the ten as illustrated.

In those instances in which two visors are used one for each side of a windshield one may be made for the left side of a car, from the standpoint of a driver sitting in it (or the right side as viewed in the drawings), with only two of corrugations 181 and only one set of 182 between them. That is to say the corrugations to the left of the two sets closest to the right as viewed in Figure 4 could be dropped. The curvature of a windshield is greater nearer the edge of the car. A left hand visor would be made correspondingly, with two corrugations 181 toward the right hand side of the driver or the left side as viewed in Figure 20 and one of 182 between them. As a matter of fact this expedient is ordinarily not necessary and is undesirable because it demands the use of right and left handed visors.

Figures 2 and 3 show a form of my invention which is cheaper but less rigid and less attractive looking. In any case the difference in cost between the forms of this invention made out of impermanent materials is measurable in pennies or mills.

In this instance I make my entire visor of a sheet 190 of which a central or roof portion only is constructed of stock made with corrugations 191 which are applied to each piece separately.

Fold lines 191 and 192 are disposed between the roof of the visor and the supporting ends or wings 193 and 194. A fold line 195 permits a supporting edge 196 for the roof to be bent upwardly and fold lines 197 and 198 perform the same function for supporting surfaces 199 and 200 respectively for each wing. Strips of adhesive 203, 204 and 205 are provided for these supporting surfaces the left wing 193 the main or roof portion 196 and the right wing 194 respectively and as shown in the drawings. These tapes must be considerably wider than those previously employed in order to cover up the open portions of the corrugations in the supporting portion 196 of the roof portion of the visor.

This tape may be applied to the central portion of the device in either of two ways. It is applied to the wing portions of course in the plant in which the device is made, all surfaces being flat. The one which I prefer is to apply it to the device to the central section before it is corrugated. The tape itself will be corrugated correspondingly as the base material is corrugated. In this instance as the visor is applied to a car the tape is crumpled against the glass. The tacky inside surface adheres and although it is irregular and has a series of bumps the tape does make an excellent and effective seal. Alternatively the tape is applied to the central portion by one end only and then as the visor is applied put into position very much as a piece of masking tape is applied.

As visors of this type are put into position as previously described, of course after having been folded, the corrugations 191 in the roof portion of the visor tend to open in the front and tend to close in the back, thus compensating for the curvature of a windshield such as 171.

I wish to emphasize that my invention of an expendable visor includes both a pre-formed structure and a flat paper-like sheet with creases or other compensating instrumentalities or fold lines all as hereinabove described. For purposes of illustration I have shown preferred shapes and angles but it must be understood that other shapes and angles may be used within the scope of my broader claims. For example for the sake of appearance in certain of my visors I prefer to have the fold lines or creases between each roof portion and the adjacent wing at right angles to the forward edge of the visor but other angles are entirely practical although the angle between the planes of the roof and wing must be substantial in order to give proper support. It is necessary, however, that each attaching flange be parallel to the plane of the windshield whether flat or curved. Also I show fold lines and edges of my attaching flanges as parallel but they need not be. In fact for economy of production I have found that the rearward edges of all attaching flanges may well be made straight before the sheet is bent. As a result therefore the lower edge of each wing flange is considerably wider than the inward. This expedient as well as saving costs also produces a larger bearing surface for support at the bottom where it is most needed. In practice it has also been found that the application of a pressure-adhesive by means of a roller is cheaper and quicker than the use of cloth-like tape and is very satisfactory in service. I have also found that a heavy kraft paper with a water-proofed upper surface is satisfactory for an expendable visor, if its wet-strength is reasonably high. The upper surface of my expendable visors may be lacquered to make it water proof in the same general operation which applies a pressure-adhesive to the other or attaching sides of the flanges.

In the claims which follow as in the specification the orientation is that of a person sitting in an automobile to the windshield of which my visor has been applied. Thus "forward" or "front" indicates the side of the visor most remote from a windshield and "rearward" or "rear" that adjacent a windshield. Other terms are used correspondingly. In referring to a flat sheet before it has been folded the same orientation is employed. That is the various members and their edges, fold lines or other parts are described from the position with they will take when applied to an automobile. Thus the "rearward" edge of a flat sheet appears in the drawings as upper and the "frontward" edge as lower. For purposes of simplicity I have assumed, contrary to literal fact, that a windshield of an automobile is perpendicular. Wherever I speak of angles or the like the word "substantially" is to be understood as qualifying the description or claim.

While I have illustrated my invention as applied to a windshield of an automobile and have so stated in the preamble of certain claims it is equally applicable to any plane transparent surface for which protection from rain, snow, sleet, light or glare is desired.

The advantages of my invention are made evident by the previous portion of this specification, the sub-joined claims and the attached drawings. They include provision of an inexpensive temporary and expendable visor preferably with formations therein which compensate for curvature of the surface to which it is to be applied and pressure-sensitive adhesive for such attachment.

I claim:

1. In a visor as for a curved windshield of an automobile, said visor being formed from a unitary paper-like flat sheet, a main roof portion projecting forwardly from the windshield, said roof portion being longer than it is wide, a roof attaching flange extending in a vertical direction from the rearward relatively long side of said roof portion and parallel to the plane of the windshield when applied, compensating corrugations in said flange and said roof section to accommodate the curve produced in the visor when it is applied to curved windshields, end or wing portions extending from the side edges of said roof portion at substantial angles to the plane of said roof portion and normal to the plane of said windshield, attaching wing flanges extending from a rear edge of each of said wing portions parallel to said surface of said windshield, and adhesive means for securing all of said flanges to said windshield.

2. As a new article of manufacture use and sale, a unitary flexible paper-like flat sheet which can be folded into a temporary visor as for a curved windshield of an automobile, said sheet embodying a main roof portion, said roof portion being longer than it is wide, a roof attaching flange extendable in a vertical direction from the rearward relatively long side of said roof portion and parallel to the plane of the windshield after the visor has been applied, compensating corrugations in said flange and said roof section to accommodate the curve produced in the visor when it is applied to a curved windshield, end or wing portions extendable from the side edges of said roof portion at substantial angles to the plane of said roof portion and normal to the plane of said windshield when so applied, attaching wing flanges extendable from a rear edge of each of said wing portions parallel to said surface of said windshield when said visor has been applied, and adhesive means for securing all of said flanges to said windshield.

3. As a new article of manufacture use and sale, a unitary readily-flexible paper-like flat sheet which without tools can be folded into a temporary visor as for a curved windshield of an automobile, said unitary sheet embodying a main roof portion, said roof portion being longer than it is wide, attaching flange instrumentalities extendable in a generally vertical direction from said roof portion and after the visor has been applied being parallel to the plane of the windshield, a plurality of compensating formations in said attaching flange instrumentalities to accommodate the curve produced in the visor as it is being applied to a curved windshield, and adhesive means for securing said instrumentalities to a windshield.

4. In a visor as for a curved windshield of an automobile, said visor being formed from a unitary paper-like flat sheet, a central roof portion projecting forwardly from the windshield when the visor has been applied thereto, a roof attaching flange extending in a vertical direction therefrom and parallel to the surface of the windshield when so attached, sets of V-shaped corrugations, some with the point of the V within the body of the roof section and extending outwardly toward the outer edge and others with the point of the V within the roof section and extending backwardly across a portion of said roof section and upwardly across said flange, and means for supporting the ends of said roof section by said windshield.

5. As a new article of manufacture use and sale, a unitary paper-like flat sheet which can be folded into a temporary visor as for a curved windshield of an automobile, said sheet embodying a central roof portion adapted to project forwardly from the windshield, when attached thereto a roof attaching flange, a fold line between said roof and said roof flange, said flange extending in a vertical direction therefrom and parallel to the surface of the windshield when folded on said line and so attached, sets of V-shaped corrugations, some with the point of the V within the body of the roof section and extending outwardly toward the outer edge and others with the point of the V within the roof section and extending backwardly across a portion of said roof section and upwardly across said flange, and means for supporting the ends of said roof section after said visor has been attached.

6. In a visor as for a curved windshield of an automobile, formed from a unitary flexible paper-like flat sheet, a central main roof portion adapted to project forwardly from the windshield, said main roof portion being longer than it is wide, a roof attaching flange portion coextensive therewith at the rear relatively long edge thereof, corrugations extending across said flange portion and at least a portion of said main roof portion to compensate for the curvature caused by said windshield when the visor is applied thereto, and means for supporting the ends of said roof section by said windshield.

7. As a new article of manufacture use and sale, a unitary flexible paper-like flat sheet which can be folded into a temporary visor as for a curved windshield of an automobile, said unitary sheet embodying a central main roof portion longer than it is wide adapted to project forwardly from a windshield when said sheet has been folded and attached to a windshield, a roof attaching flange portion at the rear relatively long edge of said roof portion, a curved fold line extending across said main roof portion upon which said roof flange can be folded into a vertical plane parallel to the surface of a windshield for attachment therewith, corrugations extending across said flange portion and at least a portion of said main roof portion to compensate for the curvature caused by said windshield when the visor is applied thereto, and means for supporting the ends of said roof section by said windshield when the visor is attached thereto.

8. In a visor ready for application to a windshield of an automobile formed from a single paper-like and flexible flat sheet, a central main roof portion adapted to project forwardly from a windshield, said main portion being longer than it is wide, an attaching flange co-extensive at the rear with the relatively long edge thereof, the outer or upper edge of said flange portion being curved, and corrugations extending across said flange portion which in association with the curvature of the edge of said flange compensate for curvature caused by said windshield if curved when the visor is applied thereto; means being provided for attaching said flange portion to the windshield.

9. As a new article of manufacture use and sale, a unitary thin flexible paper-like flat sheet which can be folded into a visor for temporary attachment as to a curved windshield of an automobile, said unitary sheet embodying a central main roof portion longer than it is wide, adapted to project forwardly when said sheet has been folded and attached to a windshield, a roof attaching flange portion at the rear relatively long edge of said roof portion, a curved fold line extending across said main roof portion upon which said roof flange can be folded into a vertical plane parallel to the surface of the windshield for attachment thereto, the chord of said curved line being generally parallel to the plane of the base of the automobile when said sheet is attached thereto, corrugations extending across said flange portion and engaging said curved rear edge to compensate for the curvature caused by said windshield when the visor is applied thereto; means being provided for detachably connecting said flange portion to said windshield.

10. As a new article of manufacture use and sale, a unitary paper-like flat sheet which can be folded into a temporary visor as for a curved windshield of an automobile, a central main roof portion adapted to project forwardly from a windshield when the sheet is folded into a visor which is attached to a windshield, a roof attaching flange portion coextensive therewith at the rear relatively long edge of said roof portion, a curved fold line extending across said main roof portion between said main roof portion and said flange portion upon which said roof flange can be folded into a vertical plane parallel to the surface of the windshield for attachment thereto, corrugations extending across said flange portion and at least a portion of said main roof portion to compensate for the curvature caused by said windshield after the visor has been applied thereto, a wing portion coextensive with said central roof portion on each relatively short end of said roof portion, a wing attaching flange coextensive with each wing portion at the rear edge of said wing portion, a fold line between each of said wings and its wing attaching flange upon which said wing flange can be folded into a plane parallel with that of the outside surface of said windshield for attachment thereto, a slit between said roof flange and each of said wing flanges, a fold line extending between the inner point of each of said slits and the forward edge of said roof portion separating said roof portion from the adjacent wing portion upon which said wing portion can be folded downwardly preparatory to the attachment of said wing flanges to said surface of said windshield, and an adhesive upon the side of each of said flanges adapted to contact said surface.

11. As a new article of manufacture and use and sale, a unitary single thin readily-flexible sheet adapted to be folded into a disposable visor to be temporarily attached to a windshield of an automobile; said sheet comprising a supporting strip normally flat and straight and adapted to be folded at an angle to the remainder of said sheet and to be attached to the front surface of the windshield adjacent the upper portion thereof, the relatively long edge of said supporting strip being curved and having therein a plurality of compensating formations reaching to said curved edge permitting play therein, thereby giving flexibility to said strip in both a vertical plane parallel to that of said windshield and a horizontal plane angular thereto thereby adapting said support to be positioned other than in a horizontal line which in both a vertical and horizontal plane is straight and to be curved as it is attached to a curved windshield, said sheet also including a roof-like portion normally parallel to said supporting strip which when said supporting strip is folded at an angle thereto parallel to that of said windshield and said supporting strip is attached to said windshield extends forwardly from said strip and conforms to the contour of said strip and is supported thereby, whereby said disposable visor after folding can be attached and will conform to a windshield whether straight or curved; means being provided to attach said supporting strip to said windshield.

12. In a detachable and temporary visor as for a windshield of an automobile formed from a single flexible flat sheet, said sheet embodying a supporting strip and a roof-like strip integral therewith, said supporting strip being normally flat and adapted to be attached to the front surface of the windshield adjacent the upper horizontal edge of said windshield and generally parallel thereto, the relatively long edge of said supporting strip being curved in an arc the chord of which is generally parallel to the base of the automobile after the visor is assembled therewith and said supporting strip embodying a plurality of compensating formations extending to the outer edge thereof adapting it to be distorted from its normally straight and flat shape and positioned other than in a straight line in both a vertical and a horizontal plane whereby it can be curved in both said planes as it is attached to the windshield, and said forwardly facing and flexible roof-like strip extending from said supporting strip and supported thereby, said formations extending in a direction substantially normal to the line of junction of said strip and said roof-like strip, whereby said supporting strip can be attached to windshields of widely differing curvatures of a plurality of automobiles respectively.

13. As a new article of manufacture use and sale, a disposable paper-like and readily flexible flat sheet adapted to be formed by a user without tools into a temporary detachable visor as for a windshield of an automobile; said unitary sheet embodying a supporting strip and roof-like portion, said supporting strip after having been formed into a supporting visor being generally vertical and said roof-like portion being generally horizontal and curved in an arc the chord of which is generally parallel to the plane of the base of the automobile (after the visor is attached thereto), said supporting strip being foldable at an angle to said roof-like portion so that it extends forwardly therefrom and said supporting strip being adapted to be attached to the front surface of the windshield adjacent said upper horizontal portion of said windshield and generally parallel thereto, said supporting strip including a plurality of compensating formations giving play thereto along a longitudinal dimension thereof in said vertical plane, said roof-like portion being bendable into an arc as said supporting strip is attached to said windshield, thereby adapting said visor to be formed and distorted from its flat shape and to conform to the contour of the windshield whether flat or curved.

(References on following page)

References Cited in the file of this patent

UNITED STATES PATENTS

| | | | |
|---|---|---|---|
| 383,415 | Stockwell | May 22, | 1888 |
| 385,726 | Reynolds | July 10, | 1888 |
| 1,078,765 | Baldwin | Nov. 18, | 1913 |
| 1,119,177 | Krafft | Dec. 1, | 1914 |
| 1,478,279 | Henne | Dec. 18, | 1923 |
| 1,644,662 | Anderson | Oct. 11, | 1927 |
| 1,777,435 | Hogelund | Oct. 7, | 1930 |
| 2,218,388 | Twombly | Oct. 15, | 1940 |
| 2,326,267 | Vavroch | Aug. 10, | 1943 |
| 2,334,856 | Atkinson | Nov. 23, | 1943 |
| 2,338,199 | Parke | Jan. 4, | 1944 |
| 2,539,763 | Wilson | Jan. 30, | 1951 |
| 2,546,609 | Morris | Mar. 27, | 1951 |

FOREIGN PATENTS

| | | | |
|---|---|---|---|
| 238,908 | Great Britain | Aug. 25, | 1925 |